United States Patent
Jain et al.

(10) Patent No.: US 10,339,197 B2
(45) Date of Patent: Jul. 2, 2019

(54) METHOD AND SYSTEM FOR BOOKMARKING A WEBPAGE

(71) Applicant: Samsung Electronics Co., Ltd., Suwon-si, Gyeonggi-do (KR)

(72) Inventors: Arihant Jain, Noida (IN); Himanshu Gupta, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 15/230,914

(22) Filed: Aug. 8, 2016

(65) Prior Publication Data

US 2017/0052994 A1 Feb. 23, 2017

(30) Foreign Application Priority Data

Aug. 18, 2015 (IN) ............................ 2546/DEL/2015

(51) Int. Cl.
*G06F 16/955* (2019.01)
(52) U.S. Cl.
CPC ................................ *G06F 16/9562* (2019.01)
(58) Field of Classification Search
CPC .......... G06F 17/30893; G06F 17/3089; G06F 17/2247; G06F 17/30884; G06F 16/9562; G06F 3/04855; G06F 16/00
See application file for complete search history.

(56) References Cited

U.S. PATENT DOCUMENTS

| | | | |
|---|---|---|---|
| 6,219,679 B1 | 4/2001 | Brisebois et al. | |
| 6,970,867 B1 | 11/2005 | Hsu et al. | |
| 2003/0225891 A1 | 12/2003 | Stienhans | |
| 2004/0205543 A1 | 10/2004 | Awada et al. | |
| 2007/0283288 A1 | 12/2007 | Jeffery et al. | |
| 2008/0052668 A1 | 2/2008 | Craig et al. | |
| 2008/0263441 A1* | 10/2008 | Park | G06F 17/30884 715/241 |
| 2008/0313206 A1 | 12/2008 | Kordun et al. | |
| 2009/0006304 A1 | 1/2009 | Ma et al. | |
| 2009/0178008 A1* | 7/2009 | Herz | G06F 3/04817 715/840 |
| 2012/0047161 A1* | 2/2012 | Moadus | G06F 17/3089 707/769 |
| 2012/0246558 A1 | 9/2012 | Brooks et al. | |

(Continued)

OTHER PUBLICATIONS

ASCIIcasts—"Episode 175—AJAX History and Bookmarks", http://asciicasts.com/episodes/175-ajax-history-and-bookmarks.

(Continued)

*Primary Examiner* — Etienne P Leroux

(74) *Attorney, Agent, or Firm* — Jefferson IP Law, LLP

(57) ABSTRACT

The present disclosure describes method and systems for bookmarking. The method includes detecting a plurality of webpage elements having the same Uniform Resource Locator (URL) from among webpage elements on a webpage. The method further includes determining a default display index value associated with each of the plurality of webpage elements having the same URL. The method further includes updating the default display index value of at least one of the plurality of webpage elements in response to a bookmark event and storing the updated display index value. The method further includes bookmarking the webpage according to the at least one updated display index value.

20 Claims, 18 Drawing Sheets

(56) References Cited

U.S. PATENT DOCUMENTS

| | | | |
|---|---|---|---|
| 2013/0145252 A1* | 6/2013 | Lie | G06F 16/00 |
| | | | 715/234 |
| 2013/0227392 A1* | 8/2013 | Zhong | G06F 17/3089 |
| | | | 715/234 |
| 2013/0268832 A1 | 10/2013 | Vemireddy | |
| 2015/0012813 A1* | 1/2015 | Naderi | G06F 3/04855 |
| | | | 715/234 |
| 2016/0019464 A1* | 1/2016 | Madhavan | G06F 17/30893 |
| | | | 706/11 |

OTHER PUBLICATIONS

History API—Dive Into HTML5, No. II. Manipulating History for Fun & Profit, http://diveintohtml5.info/history.html.
Daniel F Zucker, "What does AJAX mean for you?", Interactions, Association for Computing Machinery, Inc, US, vol. 14, No. 5, Sep. 1, 2007, pp. 10-12, XP058169605.

\* cited by examiner

METHOD AND SYSTEM FOR BOOKMARKING A WEBPAGE

CROSS-REFERENCE TO RELATED APPLICATION

This application claims priority from 2546/DEL/2015 filed on Aug. 18, 2015, in the Indian Patent Office, the disclosure of which is incorporated herein in its entirety by reference.

BACKGROUND

The present disclosure relates to methods and systems for assisting navigation of a webpage and in particular relates to bookmarking sections/tabs of a webpage which have the same Uniform Resource Locators (URLs).

A bookmark is a feature that is available in most web browsers that allows a user to store web addresses or URLs of web pages that the user wishes to view without having to re-input the URL. When a user accesses a bookmarked web page, sections/tabs (e.g., subpages) included in the webpage are generally displayed according to a default order set by website developers.

Websites may contain multiple webpages, and for each of the webpages, both the webpage and sections/tabs in the webpage may have the same URL. Website developers use Ajax or different scripts to create such webpages and to decide and control the order in which sections/tabs in the webpages are displayed. Several mechanisms exist in the art that provide easy navigation of such web pages where a user doesn't need to download sections/tabs again and again. The entire webpage is downloaded and the user can navigate the webpage through each of the sections/tabs included in the webpage. The URL is generally the same for each section/tab because each section/tab represents specific content of the same webpage.

In such cases, when the user wants to bookmark a section/tab of a webpage having the same URL as that of other sections/tabs in a webpage, no option to bookmark the desired section/tab is generally provided. An option of bookmarking the URL of the webpage itself is only provided. When a user accesses the webpage via such a bookmark, the webpage is always loaded and displayed in a default order as set by the website developer. Thereafter, the user will have to manually navigate to the section/tab of a webpage which he specifically wanted to bookmark or access. Such manual navigation involves remembering several navigation steps to reach the desired section/tab and also becomes a non-trivial endeavor, especially if the webpage is a large one.

Many techniques have been developed in which website developers use scripts during website development which allow browsers to recognize internal webpages (e.g., sections/tabs of a webpage) and bookmark the same. However, the existing techniques are completely dependent upon the website developers, as each website developer must use scripts which allow a browser to bookmark internal web pages.

Thus, there exists a need to overcome the above problems and provide a mechanism enabling a browser itself to identify and bookmark internal sections of a webpage according to a user input without being dependent on the website developers.

SUMMARY OF THE INVENTION

In an example embodiment, a method of bookmarking is provided. The method includes detecting a plurality of webpage elements having the same Uniform Resource Locator (URL) from among webpage elements on a webpage. The method may further include determining a default display index value associated with each of the plurality of webpage elements having the same URL and updating the default display index value of at least one of the plurality of webpage elements in response to a bookmark event and storing the same. The method may further include bookmarking the webpage according to the updated display index value.

In an example embodiment, the present disclosure describes a system for bookmarking. The system includes a detecting module. The detecting module may detect a plurality of webpage elements having the same Uniform Resource Locator (URL) from among webpage elements on a webpage being rendered. A processing module further provided may determine default display index value associated with each of the plurality of webpage elements having the same URL. The system may further include a bookmarking module which may update the default display index value of at least one of the plurality of webpage elements in response to a bookmark event and bookmarking the webpage according to the at least one updated display index value.

In another example embodiment, a method of rendering a bookmarked webpage is provided. The method includes receiving a request for rendering the bookmarked webpage and identifying whether the bookmarked webpage includes an updated display index value(s). The method may further include generating modified source code based on the updated display index value(s) and rendering the bookmarked webpage based on the modified source code.

In another example embodiment, a system for rendering a bookmarked webpage is described. The system includes a receiving module and a processing module. The receiving module may receive a request for rendering the bookmarked webpage, and the processing module may identify whether the bookmarked webpage includes an updated display index value(s). The system may further include a generating module and a rendering module. The generating module may generate modified source code based on the updated display index value(s) and the rendering module may render the bookmarked webpage based on the modified source code.

In another example embodiment, a method of assisting navigation of a webpage being rendered, the webpage including a plurality of webpage elements having the same Uniform Resource locator (URL) from among webpage elements on the webpage is provided. The method includes determining a default display index value associated with each of the plurality of webpage elements having the same URL and updating, based on one or more of a user action, a user preference, user behavior, the default display index value of at least one of the plurality of webpage elements having the same URL. The method may further include storing the webpage or an identifier of the webpage with said at least one updated display index value.

In another example embodiment, a method of rendering a webpage including a plurality of webpage elements having the same Uniform Resource locator (URL) is provided. The method includes receiving a request for rendering the webpage, identifying whether the requested webpage includes a modified display index, and rendering the webpage based on the identification of the modified display index.

To further clarify advantages and features of the present disclosure, a more particular description of the invention will be rendered by reference to example embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE ACCOMPANYING DRAWINGS

These and other features, aspects, and advantages of the present disclosure will become better understood in view of the following detailed description and the accompanying drawings, in which.

Figure 1:
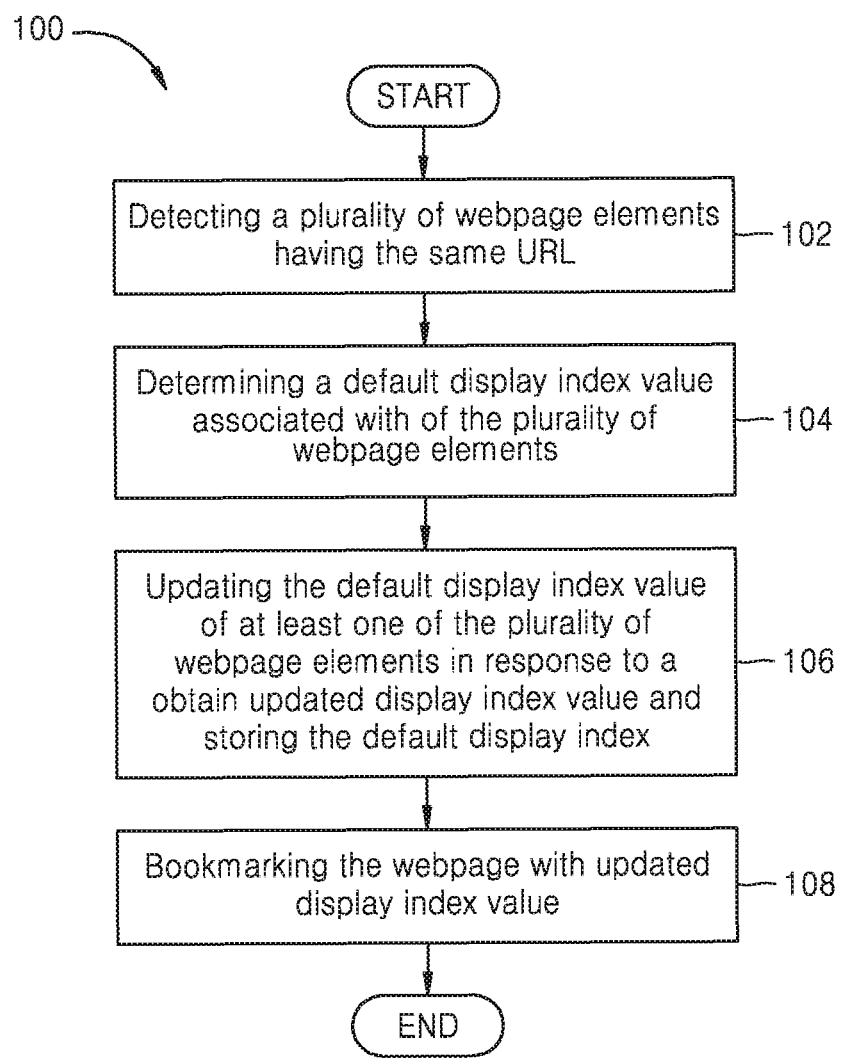
FIG. 1 is a flowchart illustrating bookmarking a webpage in accordance with an example embodiment of the invention.

Further, skilled artisans will appreciate that elements in the drawings are illustrated for simplicity and may not have been necessarily been drawn to scale. For example, the flow charts illustrate steps involved to help to improve understanding of aspects of the present disclosure. Furthermore, in terms of the construction of the device, one or more components of the device may have been represented in the drawings by conventional symbols, and the drawings may show only those details pertinent to understanding the embodiments of the present disclosure so as not to obscure the drawings with details that would be readily apparent to those of ordinary skill in the art having benefit of the description herein. Throughout the drawings, the same characters represent like parts, and repeated descriptions thereof are omitted herein.

DETAILED DESCRIPTION

For the purpose of promoting an understanding of aspects of the invention, reference will now be made to the example embodiments illustrated in the drawings and specific language will be used to describe the same. It will nevertheless be understood that no limitation of the scope of the invention is thereby intended, and such alterations and further modifications in the illustrated system, along with further applications of the principles of the invention as illustrated therein, would be readily apparent to those of ordinary skill in the art to which the invention relates.

It will be understood by those skilled in the art that the foregoing general description and the following detailed descriptions of example embodiments of the invention are not intended to be restrictive thereof.

Reference throughout this specification to "an aspect", "another aspect" or similar language means that a feature, structure, or characteristic described in connection with an example embodiment is included in at least example embodiment of the present disclosure. Thus, appearances of the phrase "in an example embodiment", "in another example embodiment" and similar language throughout this specification may, but do not necessarily, refer to the same embodiment.

The terms "comprises", "comprising", or any other variations thereof, are intended to cover a non-exclusive inclusion, such that a process or method that comprises a list of steps is not limited to including only those steps but may include other steps not expressly listed or inherent to such a process or method. Similarly, one or more devices or subsystems or elements or structures or components proceeded by "comprises . . . a" does not, without more constraints, preclude the existence of other or additional devices, subsystems, elements, structures, or components.

Unless otherwise defined, all technical and scientific terms used herein have the same meaning as commonly understood by one of ordinary skill in the art to which aspects of the present disclosure pertain. The system, methods, and examples provided herein are illustrative only and are not intended to be limiting.

Embodiments of the present disclosure will be described below in detail with reference to the accompanying drawings.

FIG. 1 is a flowchart illustrating bookmarking a webpage in accordance with an example embodiment of the present disclosure. The method 100 may include step 102 of detecting a plurality of webpage elements having the same Uniform Resource Locator (URL) from among webpage elements on a webpage. The detecting may performed by computing devices includes, but not limited to, a desktop computer, a laptop computer, a palm top computer, a mobile terminal and any wired or wireless communication terminal having an internet browser. In an example embodiment, step 102 of detecting a plurality of webpage elements having the same URL may include parsing source code of the webpage and identifying a plurality of identifiers in the source code. The plurality of identifiers may indicate which of the plurality of webpage elements have the same URL. The webpage elements may include, but are not limited to, one or more of textual data, multimedia content including video, still images, audio images, graphics, animation, and a hyperlink to another webpage.

The method may further include step 104 of determining a default display index value associated with each of the plurality of webpage elements having the same URL and step 106 of updating the default display index value of at least one of the plurality of webpage elements in response to a bookmark event and storing the same. The updating and storing of the updated display index value may be performed at the user/client end. The display index values are identifiers stored in a display index. When a browser renders a web page, the browser may display content of the webpage according to an order based on the display index values. In an example embodiment, the bookmark event may include at least one user input of: highlighting of a webpage element; input of a combination of keys; hovering over a webpage element for more than a threshold period; clicking on a bookmark shortcut key; selecting a bookmark option via a mouse input; or selecting a webpage URL from a favorites bar section/tab. In an example embodiment, the default display index values and updated display index values may be stored in the same database or in different databases at the user/client device. The database may be stored on a local memory or a cloud server. The updated display index values stored in the database may be used at the time of rendering of the webpage. The method may further include step 108 of bookmarking the webpage according to at least one updated display index value. Whenever the webpage bookmarked in step 108 is rendered, the browser at the client application end at run time will read the database and may create a virtual page source/modified source code of the requested bookmark by altering the default display index values. The altering may include replacing or interchanging the default display index with the updated display index values stored in the database.

In an example embodiment, step 102 for detecting a plurality of webpage elements having the same URL may include parsing source code of the webpage and identifying a plurality of identifiers in the source code. The plurality of identifiers may indicate which of the plurality of webpage elements have the same URL.

In a further example embodiment, step 106 for updating the default display index value of at least one of the plurality of webpage elements may include updating the default display index values of the plurality of webpage elements.

In a further example embodiment, step 106 for updating the default display index value of at least one of the plurality of webpage elements may include interchanging the default display index value of the webpage element to be bookmarked with the updated display index value.

In a further example embodiment, step 106 for updating the default display index value of at least one of the plurality of webpage elements may include changing the default display index value of a first webpage element included among the plurality of webpage elements having the same URL and rearranging the display index value of remaining webpage elements. In an example embodiment, the rearranging is based on the default display index values of the remaining webpage elements. In another example embodiment, rearranging the display index values may include at least one of: increasing the display index values of the remaining webpage elements by a constant; or decreasing the display index values of the remaining webpage elements by a constant. In an example embodiment, rearranging may include randomly rearranging the remaining webpage elements, but is not limited thereto. Said randomly rearranging may include randomly assigning display index values to the remaining webpage elements. The display index values (as included in an updated display index) indicating arrangement or rearrangement of the webpage elements are stored in the database. Whenever a request for rendering a bookmarked webpage is received, the browser at the client application end will read the database and may arrange or rearrange the content at run time based on the updated default display index values.

In an example embodiment, the method 100 may further include providing a user interface which may display the default and updated display index values. In an example embodiment, the method 100 may further include providing a shortcut key or icon for direct bookmarking of the webpage according to an updated display index value. In an example, a shortcut icon for smart bookmarks near the content title is displayed so that users can bookmark, for example, in one step. Such a shortcut icon may be displayed when a section/tab is highlighted or when a user hovers over an area on the webpage for a threshold time period, or upon receiving an input in the form of combination of one or more keys from the user, but is not limited thereto.

In an example embodiment, the method 100 may further include providing an option for selective rendering of webpage elements based on their corresponding updated display index values. Such preferential rendering enables saving user's time by directly rendering the bookmarked content on a webpage without rendering other content on the webpage.

In an example embodiment, the method 100 may further include identifying and storing a position of at least one of the plurality of webpage elements on the webpage. In an example embodiment, said identifying the position of at least one of the plurality of webpage elements may include at least one of: determining coordinates of the at least one of the plurality of webpage elements on the webpage; or determining scroll length to reach the at least one of the plurality of webpage elements on the webpage (i.e., the determined coordinates). The present disclosure provides for determining of both horizontal and vertical scroll lengths depending on the zoom level of the application. This is beneficial in scenarios where the webpages have a huge page length/size and there is always a possibility that the content/webpage element which the user has bookmarked is not displayed in the default display area when the bookmarked webpage is rendered in the future. Storing the scroll position of the webpage element/content in accordance with the inventions allows the browser to directly jump or auto scroll to the bookmarked webpage element/content in the future without requiring a user to manually scroll to the bookmarked webpage element/content. In an example embodiment, the position of the at least one of the plurality of webpage elements is stored in a database that may be stored in a local memory or on a cloud server.

In an example embodiment, the present disclosure may be implemented for bookmarking an internal section/tab that may be present at a node level in a hierarchical structure of sections/tabs of a website. This is beneficial in scenarios where a webpage is a multi-level/hierarchical structure having several internal sections/tabs and the user has to remember navigation steps to reach a desired section/tab. Generally, each of the sections/tabs in a webpage is linked with a node identifier that is set by the website developers during the development stage. The node identifier indicates the position or level of a section/tab in the multi-level/hierarchical structure. The present disclosure involves storing the node identifiers of the tab/section to be bookmarked in the multi-level/hierarchical structure while creating the bookmark and directly navigating to the section/tab based on the stored node identifier when the bookmarked page is rendered.

Figure 2:
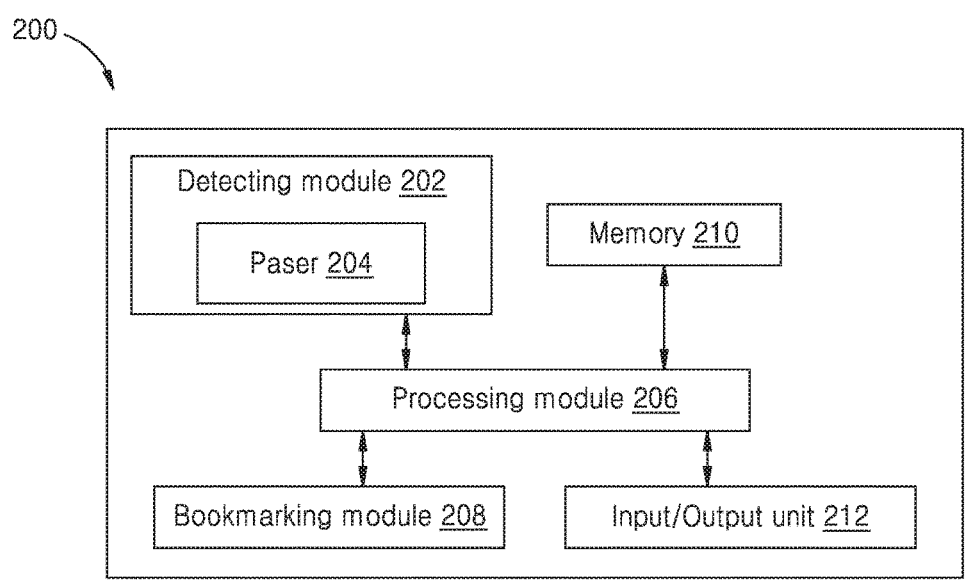
FIG. 2 is a block diagram of a system for bookmarking in accordance with an example embodiment of the present disclosure.

FIG. 2 is a block diagram of the system 200 for bookmarking a webpage in accordance with an example embodiment of the present disclosure. The system 200 may include a detecting module 202 which may detect a plurality of webpage elements having the same Uniform Resource Locator (URL) from among webpage elements on a webpage being rendered. In an example embodiment, the detecting module 202 may include a parser 204. The parser 204 may parse source code of the webpage and identify a plurality of identifiers in the source code. The plurality of identifiers may indicate which of the plurality of webpage elements have the same URL.

The detecting module 202 is further connected to a processing module 206 which may determine a default display index value associated with each of the plurality of webpage elements having the same URL. The detecting module 202 and processing module 206 may each include or be implemented as one or more processors. The system 200 may further include a bookmarking module 208 which may update the default display index value of at least one of the plurality of webpage elements in response to a bookmark event and bookmark the webpage according to an updated display index value. In an example embodiment, the bookmarking module 208 may update the default display index values of a plurality of webpage elements. In another example embodiment, bookmarking module 208 may bookmark the webpage with updated display index value using a shortcut key.

In another example embodiment, the bookmarking module 208 may interchange the default display index values with the updated display index values.

In another example embodiment, the bookmarking module 208 may change default display index value of a first webpage element among the plurality of webpage elements having the same URL and rearrange the display index values of remaining webpage elements.

In another example embodiment, the processing module 206 may selectively render the webpage elements based on their corresponding updated display index values.

In another example embodiment, the processing module 206 may identify a position of at least one of the plurality of webpage elements on the webpage.

In another example embodiment, processing module 206 may: determine coordinates of the at least one of the plurality of webpage elements on the webpage; or determine scroll length to reach the at least one of the plurality of webpage elements on the webpage (i.e., the determined coordinates).

Each of the modules of system 200 may be implemented in hardware, software, or a combination of the two. The system 200 may further include memory 210 for storing the default and updated display index values. In an example embodiment, the default and updated display index values may be stored on a cloud server. An input/output unit 212 is further provided for receiving one or more inputs from the user. Each of the aforesaid modules/units including detecting module 202, processing module 206, bookmarking module 208, memory 210 and input/output unit 212 are operably interconnected to each other. In an example embodiment, the detecting module 202, processing module 206, bookmarking module 208 may form a standalone module. In an example embodiment, each of the aforesaid modules/units including detecting module 202, processing module 206, bookmarking module 208, memory 210 and input/output unit 212 may be implemented as one or more processors.

Figure 3:
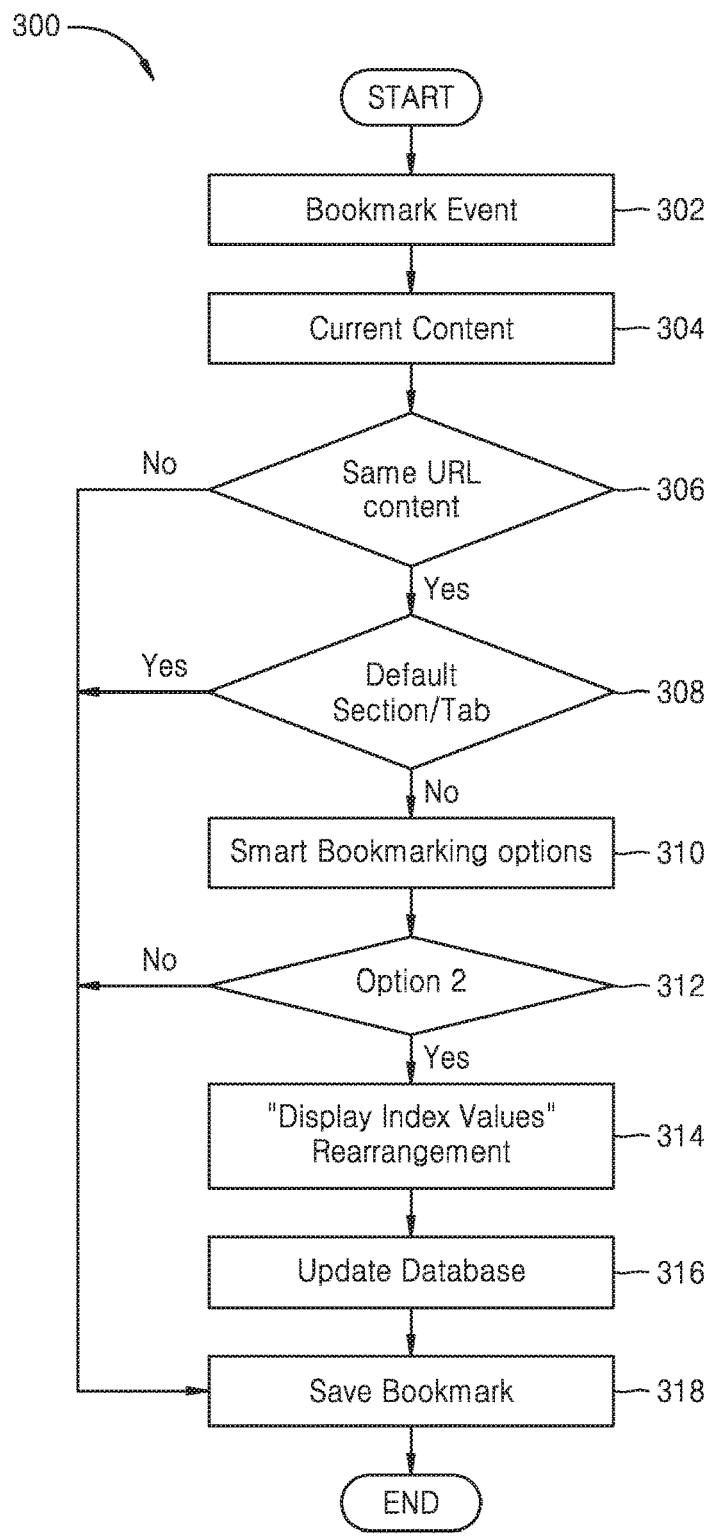
FIG. 3 is a flowchart illustrating the functioning the bookmarking module as illustrated in FIG. 2 in accordance with an example embodiment of the present disclosure.

FIG. 3 is a flowchart illustrating the functioning the bookmarking module 208 as described in FIG. 2. At step 302, an occurrence of a bookmark event input by the user is detected by the bookmarking module 208. Thereafter, at step 304, the bookmarking module 208 may analyze the current content information in response to the bookmark event. The current content is content/webpage element on the webpage for which the user has input a bookmark request. The analysis at step 304 involves further analysis at step 306 of whether webpage elements on the webpage have the same URL. If the webpage elements on the webpage do not have the same URL, the bookmarking module 208 may proceed to bookmarking (step 318) the webpage and saving the same with the default display index values set by the website developers. If the analysis at step 304 indicates that the webpage elements on the webpage have the same URL, the bookmarking module 208 at step 308 analyzes whether the user is on the default display section/tab when the bookmark event takes place. In the event of an affirmative result "Yes" of the analysis made at step 308, the bookmarking module 208 proceeds to bookmarking (step 318) the webpage and saving the same with the default display index values set by the website developers. In the event of a non-affirmative result "No" of the analysis made at step 308, the bookmarking module 208 may provide the user with smart bookmarking options at step 310. The user is provided with options 1) to bookmark the webpage with the default display content as set by the website developer or 2) to bookmark the webpage with current content set as default. At step 312, if the user selects option 1), the bookmarking module 208 may proceed to bookmarking (step 318) the webpage and saving the same with the default display index value set by the website developer. If the user selects option 2), the bookmarking module 208 may rearrange (step 314) display index values included in the display index based on the current content, thereby updating the display index, and update (step 316) the database according to the updated display index. Thereafter, the bookmarking module 208 bookmarks (at step 318) the webpage and saves the same with the updated display index.

Figure 4:
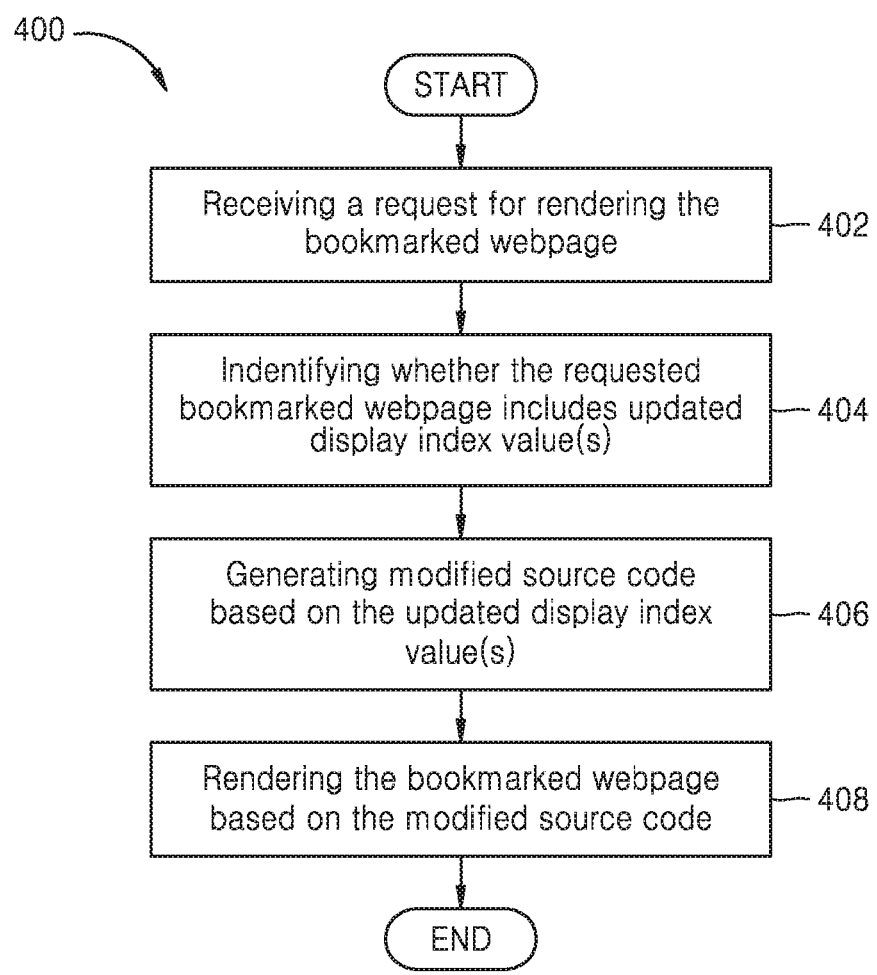
FIG. 4 is a flowchart illustrating rendering of a bookmarked webpage in accordance with an example embodiment of the invention.

FIG. 4 is a flowchart illustrating a method of rendering a bookmarked webpage in accordance with an example embodiment of the invention. The method 400 may include step 402 for receiving a request for rendering the bookmarked webpage. The request for rendering a bookmarked webpage may be generated by one or more user inputs. The one or more user inputs may include, but is not limited to, selecting the bookmarked webpage from the favorites bar provided on the browser, selecting any shortcut key provided for rendering a bookmarked webpage, etc. The method 400 may include step 404 of identifying whether the bookmarked webpage includes an updated display index value(s). The method may further include step 406 for generating modified source code based on the updated display index value(s) and step 408 for rendering the bookmarked webpage based on the modified source code. The generating of the modified source code may be performed at run time at the client application end in response to a request for rendering a bookmarked webpage. In an example embodiment, generating the modified source code may include retrieving source code for the bookmarked webpage and setting the said updated display index value(s) as the default display index value(s) in the source code.

In an example embodiment, the method 400 may include selective rendering of a section/tab of bookmarked webpage. The method includes, when a request for rendering a bookmarked webpage is received, identifying whether the bookmarked webpage includes an updated display index value(s) and whether the user has opted for selective rendering of a section/tab of the bookmarked webpage. The method further includes generating modified source code according to whether the user has opted for selective rendering, and the modified source code may enable the browser to render only the bookmarked section/tab without rendering remaining non-bookmarked sections/tabs in a webpage. Such selective rendering enables saving user's time by rendering only the bookmarked content of a webpage.

In an example embodiment, the method 400 may include rendering of a section/tab in accordance with the scroll position of a webpage element/content stored at the time of creating the bookmark. The method includes, when a request for rendering a bookmarked webpage is received, identifying whether the bookmarked webpage includes an updated display index value(s) and whether the user has opted for position based rendering of a section/tab of the bookmarked webpage. The position based rendering of a section/tab is based on the position/coordinates of the section/tab stored at the time of creating the bookmark. The method further includes generating modified source code based on the updated index value(s) and the stored position/coordinates of the section/tab, according to whether the user has opted for position based rendering, and the modified source code may enable the browser to directly jump or auto scroll to the stored position/coordinates of the bookmarked section/tab at the time of rendering. Such rendering based on the stored position/coordinates is advantageous in cases where webpages have a huge page length/size, for example, in cases where the content/webpage element which the user has bookmarked is not displayed in the default display area at the time of rendering. Such position based rendering allows a browser to directly jump or auto scroll to the stored position and avoids or minimizes the need for manually scrolling to reach to this position.

Figure 5:
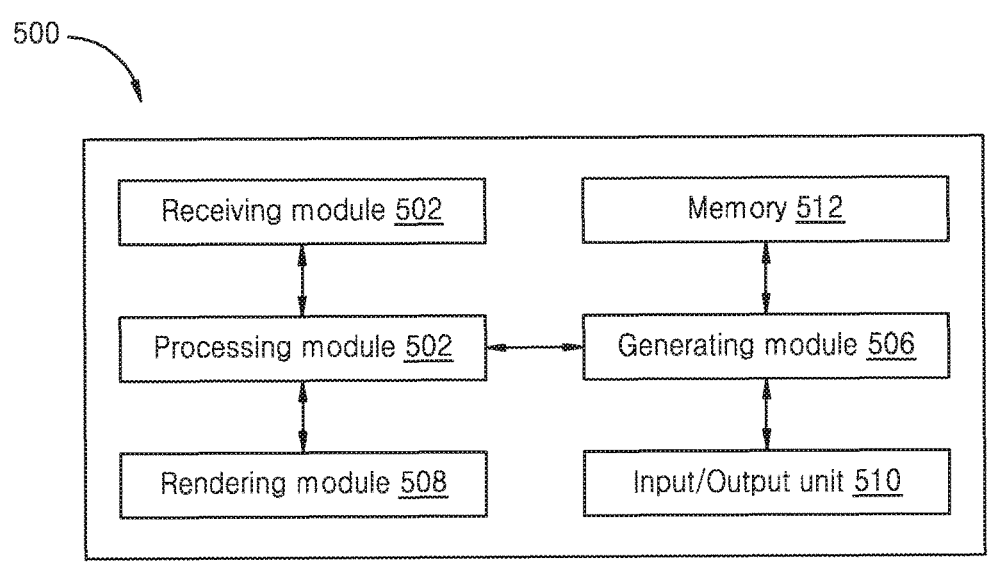
FIG. 5 is a block diagram of a system for rendering a bookmarked webpage in accordance with an example embodiment of the invention.

FIG. 5 is a block diagram illustrating the system for rendering a bookmarked webpage in accordance with an example embodiment of the present disclosure. The system 500 may include a receiving module 502 and a processing module 504. The receiving module 504 may receive a request for rendering the bookmarked webpage, and the processing module 504 may identify whether the bookmarked webpage includes an updated display index value(s). In an example embodiment, the processing module 504 may include a parser. The parser may parse source code of the bookmarked webpage and identify whether the bookmarked webpage includes an updated display index value(s). The system 500 may further include a generating module 506 for generating modified source code based on said updated display index value(s). In an example embodiment, the generating module 506 may retrieve the source code for the bookmarked webpage and set the updated display index value(s) as the default display index value(s) in the source code. A rendering module 508 is further provided for rendering the bookmarked webpage based on the modified source code. The system 500 may further include memory 510 for storing the modified source code based on the updated display index value(s). An input/output unit 512 is further provided for receiving one or more inputs from the user. Each of the aforesaid modules/units including receiving module 502, processing module 504, generating module 506, rendering module 508, memory 510 and input/output unit 512 are operably interconnected to each other. In an example embodiment, the receiving module 502, processing module 504, generating module 506, rendering module 508 may be included in a standalone module. In an example embodiment, each of the aforesaid modules/units including receiving module 502, processing module 504, generating module 506, rendering module 508, memory 512 and input/output unit 510 may be implemented as one or more processors.

Figure 6:
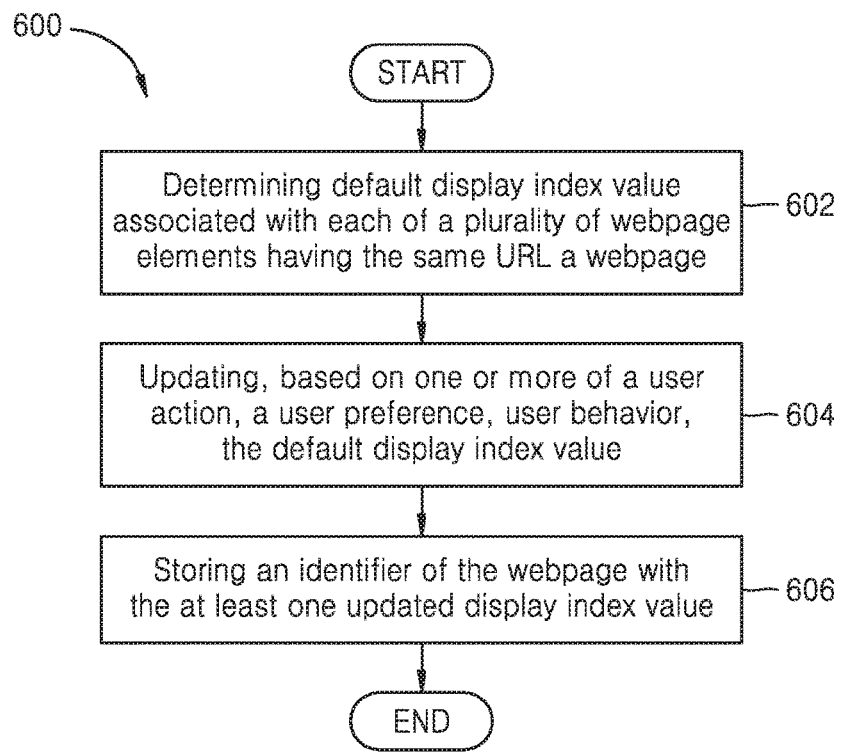
FIG. 6 is a flowchart illustrating assisting navigation of a webpage being rendered, in accordance with an example embodiment of the invention.

FIG. 6 is a flowchart illustrating a method for assisting navigation of a webpage being rendered, in accordance with an example embodiment of the present disclosure. The method 600 may include step 602 for determining a default display index value associated with each of a plurality of webpage elements having the same Uniform Resource locator (URL) from among webpage elements on a webpage. The display index values may be included in a display index. The display index values are identifiers which may instruct the browser to display content (e.g., webpage elements) of the webpage in an order based on the display index values when the web page is rendered. The method 600 may further include updating at step 604, based on one or more of a user action, a user preference, user behavior, the default display index value of at least one of the plurality of webpage elements having the same URL. Such a user action, user preference, or user behavior, may include, but is not limited to, a user hovering over a webpage element for more than a threshold period, highlighting a webpage element, input of a combination of keys, clicking a shortcut key, and selecting a webpage URL via a favorites bar, or may be based on a web history of the user (e.g., the frequency in which a user viewed webpage elements). In an example embodiment, the present disclosure also provides for recording navigation steps performed by the user when navigating the webpage, removing any duplicate navigation paths from the recorded steps, and bookmarking the webpage such that the navigation steps to reach the webpage elements are also stored. The method 600 may further include step 606 for storing the webpage or an identifier of the webpage with the at least one updated display index value.

Figure 7:
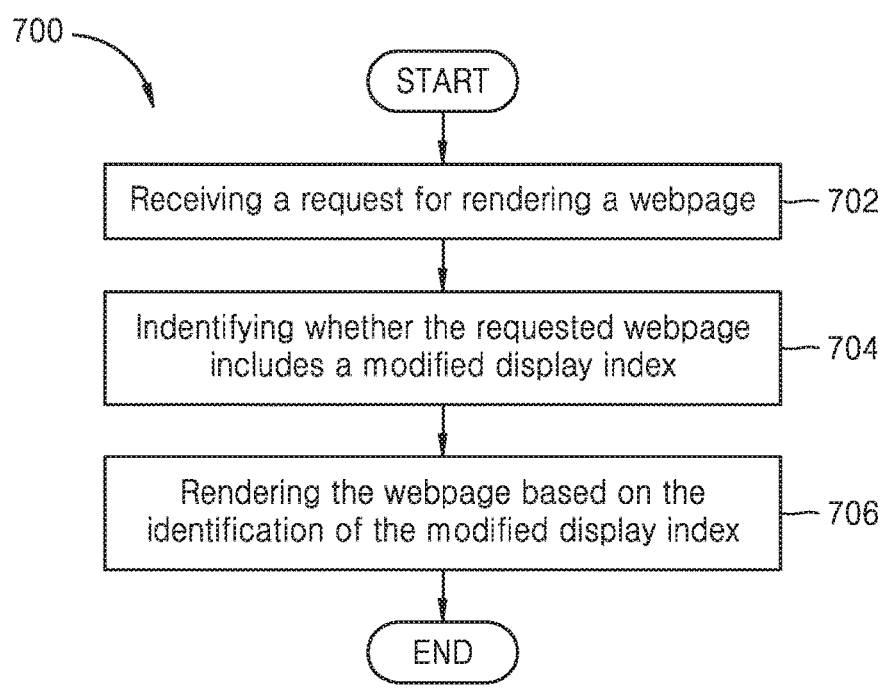
FIG. 7 is a flowchart illustrating a method for rendering a webpage in accordance with an example embodiment of the invention.

FIG. 7 is a flowchart illustrating a method for rendering a webpage. The method 700 may include a step 702 of receiving a request for rendering the webpage, the webpage including a plurality of webpage elements having the same Uniform Resource locator (URL). In an example embodiment, the request for rendering a webpage is generated based on one or more user inputs. The one or more user inputs may include, but are not limited to, selecting a webpage from the favorites bar provided on the browser, selecting a shortcut key provided for rendering a webpage, etc. The method may further include the step 704 of identifying whether the requested webpage includes a modified display index and step 706 of rendering the webpage based on the identification of the modified display index. In an example embodiment, the step 706 may further include generating modified source code based on the modified display index and rendering the webpage based on the modified source code. In an example embodiment, generating the modified source code may include retrieving source code for the requested webpage and setting the said updated display index value(s) as the default display index value(s) in said source code.

The forthcoming description of Figures depicts examples to illustrate the usefulness of the present invention. However, it may be strictly understood that the forthcoming examples shall not be construed as being limitations towards the present invention and the present invention may be extended to cover analogous implementations through other types of like mechanisms.

Figure 8:
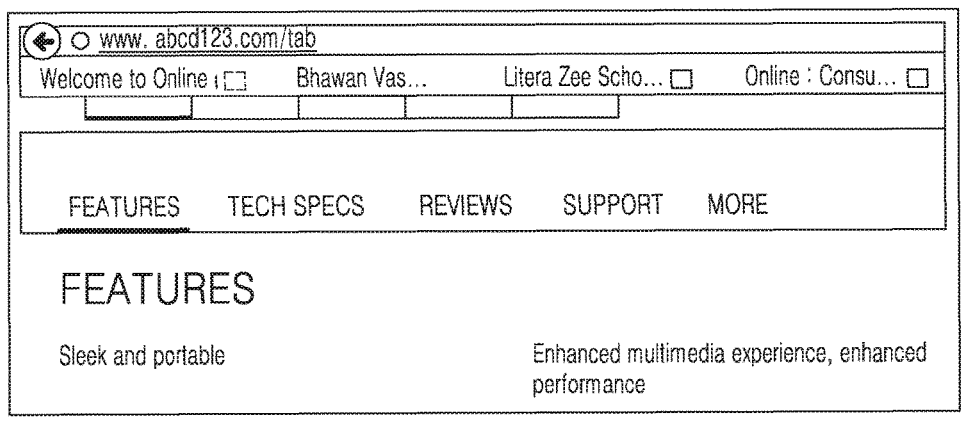
FIGS. 8-17 illustrate example embodiments of the present disclosure.

FIG. 8 illustrates an example webpage containing several sections/tabs. Here, a section/tab may correspond to a section of content. The web page in FIG. 8 contains 5 sections/tabs, FEATURES, TECH SPECS, REVIEWS, SUPPORT, and MORE, which have the same URL (www.abcd123.com/tab). Each of the sections/tabs is linked with a default display index set by the website developer. The default display index may include display index values. The display index values are identifiers which may instruct the browser to display content (e.g., webpage elements) of the webpage in an order based on the display index values when the web page is rendered Referring to FIG. 8 in combination with the previously illustrated figures, the detecting module 202 may detect multiple webpage elements, e.g., the sections/tabs FEATURES, TECH SPECS, REVIEWS, SUPPORT, MORE that have the same URL (www.abcd123.com/tab). The detecting module 202 may include a parser that parses the source code of the webpage and detects a plurality of identifiers in the source code. The plurality of identifiers, for example, may indicate webpage elements having the same URL, but are not limited thereto. The identifiers may also be referred to as node identifiers herein. The parsing may be performed by one or more parsing algorithms known to a person skilled in the art. After parsing the source code of the webpage, the parser in operational interconnection with the processing module 206 may determine the default display index value associated with each of the above sections/tabs and create a database of such content. A sample table of such a database in reference to the sections/tabs FEATURES, TECH SPECS, REVIEWS, SUPPORT, MORE is indicated in Table 1 below:

TABLE 1

| Content Title | URL | Default Display Index |
|---|---|---|
| FEATURES | www.abcd123.com/tab | 0 |
| TECH SPECS | | 1 |
| REVIEWS | | 2 |
| SUPPORT | | 3 |
| MORE | | 4 |

As seen from the above table, each of the above referred sections/tabs, i.e. FEATURES, TECH SPECS, REVIEWS, SUPPORT, MORE, is associated with a unique display index value. The display index value is an identifier which may instruct the browser to display the content of sections/tabs in accordance with the display index value associated with each tab. At the time of rendering, the parser in operational interconnection with the processing module 206 may check the display index value associated with each of the aforesaid sections/tabs, i.e. FEATURES, TECH SPECS, REVIEWS, SUPPORT, MORE, in the above database. Thereafter, a rendering module 508 may render and display the content of each of these sections/tabs in an order based on the display index values. In the present example, the display index value associated with the FEATURES section/tab is 0, and the rendering module 508 may render and display the content of the FEATURES section/tab by default, followed by the content corresponding to the other sections/tabs, i.e. TECH SPECS, REVIEWS, SUPPORT, MORE, in an order based on respective display index values.

Figure 9:
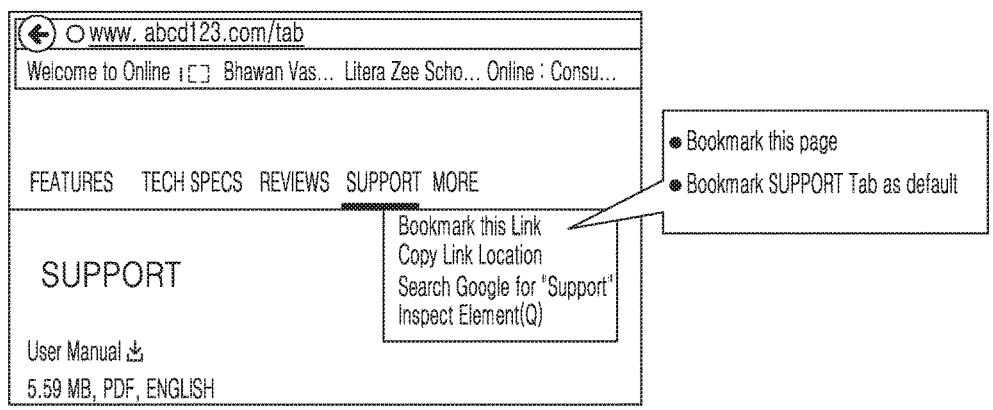
Figure 10:
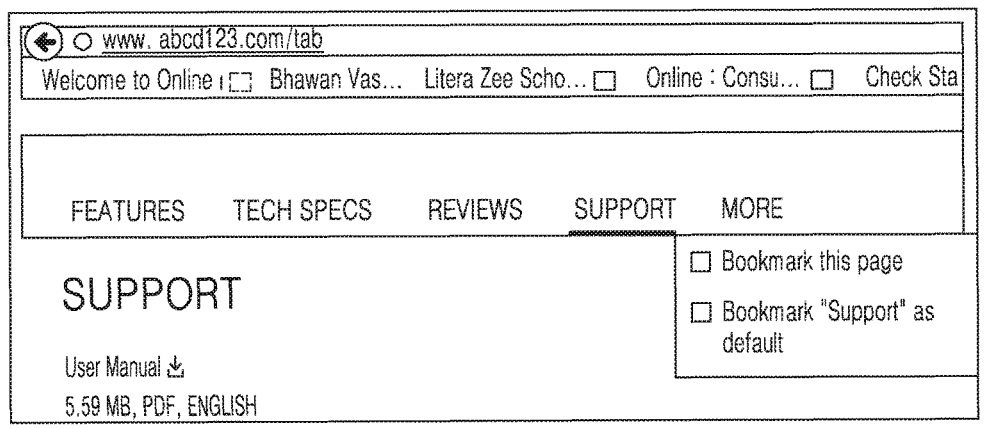

FIG. 9 illustrates a user interface in which a user attempts to bookmark a page that is not a default display page. As seen from FIG. 9, the user has currently navigated to the SUPPORT section/tab and wishes to bookmark the same. Once the user inputs a bookmark request, for example, by selecting 'Bookmark This Page, the bookmarking module 208 may provide the user with smart bookmarking options. In an example embodiment of the present disclosure, the bookmarking module 208 may provide the user with two bookmarking options: 1) Bookmark the webpage; and 2) Bookmark the webpage with the SUPPORT section/tab as the default section/tab. FIG. 10 illustrates an example user interface that may be displayed when the user inputs a bookmark request to bookmark content on the webpage which is not the default display content. The example user interface may provide the above bookmarking options to the user when the user inputs the bookmark request. In the present example, the Features section/tab is the default display section/tab, and the user is currently at the SUPPORT section/tab and wishes to bookmark the same. If the user selects option 1) to bookmark the webpage, the bookmarking module 208 may bookmark the webpage with the FEATURES section/tab as the default display section/tab.

However, if the user selects option 2) to bookmark the webpage with the SUPPORT section/tab as the default section/tab, the bookmarking module 208 may update the display index such that the SUPPORT section/tab is the default display index section/tab. For example, based on the selection input by the user, the bookmarking module 208 may update the display index values associated with the sections/tabs included in the display index. A sample table of the updated database in which the SUPPORT section/tab is bookmarked as the default section/tab is indicated in Table 2 below:

TABLE 2

| Content Title | URL | Default Display Index | New Display Index |
|---|---|---|---|
| FEATURES | www.abcd123.com/tab | 0 | 3 |
| TECH SPECS | | 1 | 1 |
| REVIEWS | | 2 | 2 |
| SUPPORT | | 3 | 0 |
| MORE | | 4 | 4 |

Figure 11:
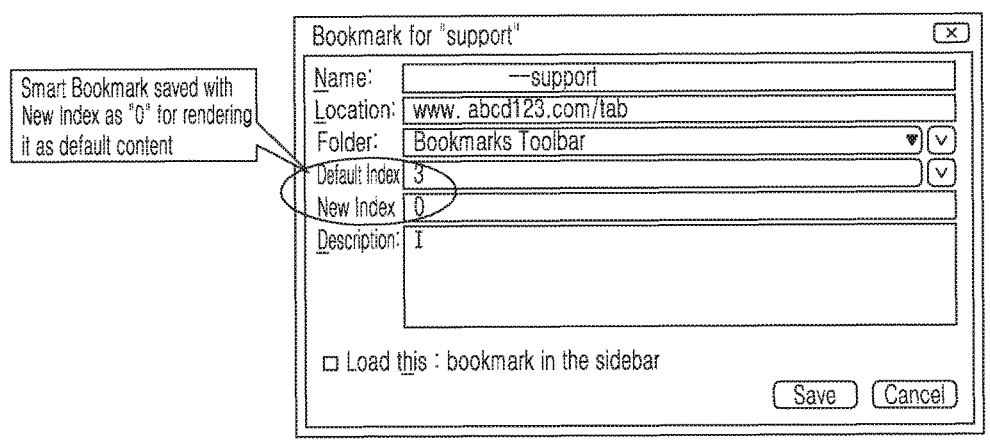

FIG. 11 illustrates an example user Interface that may be displayed, for example, as a pop-up or pop-up window, when the user selects option 2) to bookmark the webpage with the SUPPORT section/tab as the default section/tab (as referred to in the description corresponding to FIGS. 9 and 10). The user interface may display details to the user about the default display index and the updated display index in which the SUPPORT section/tab is the default section/tab. If the user selects the save option, the bookmarking module 208 may bookmark the webpage in accordance with the example embodiments of the invention, in which the display index values are updated such that the SUPPORT section/tab is the default tab. Whenever the user selects the saved bookmarked page at a future time via, for example, a browser, the browser will automatically navigate to the SUPPORT section/tab when rendering the webpage.

Figure 12:
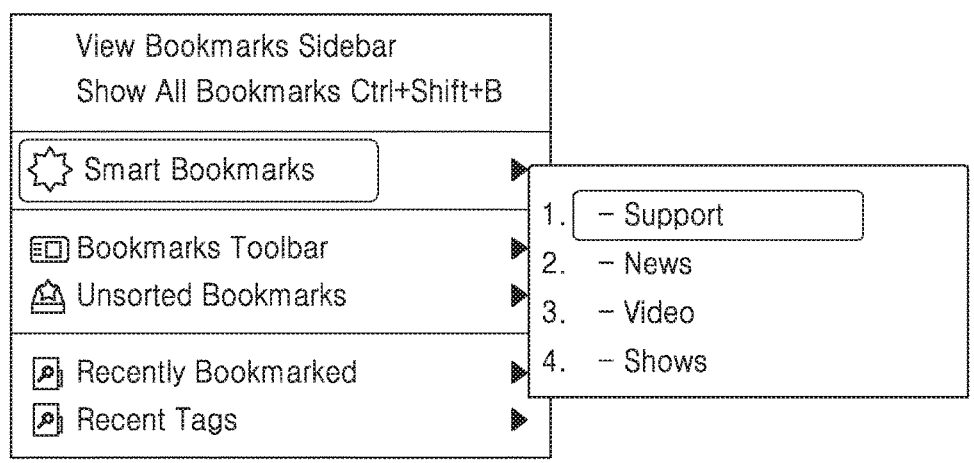
Figure 13:
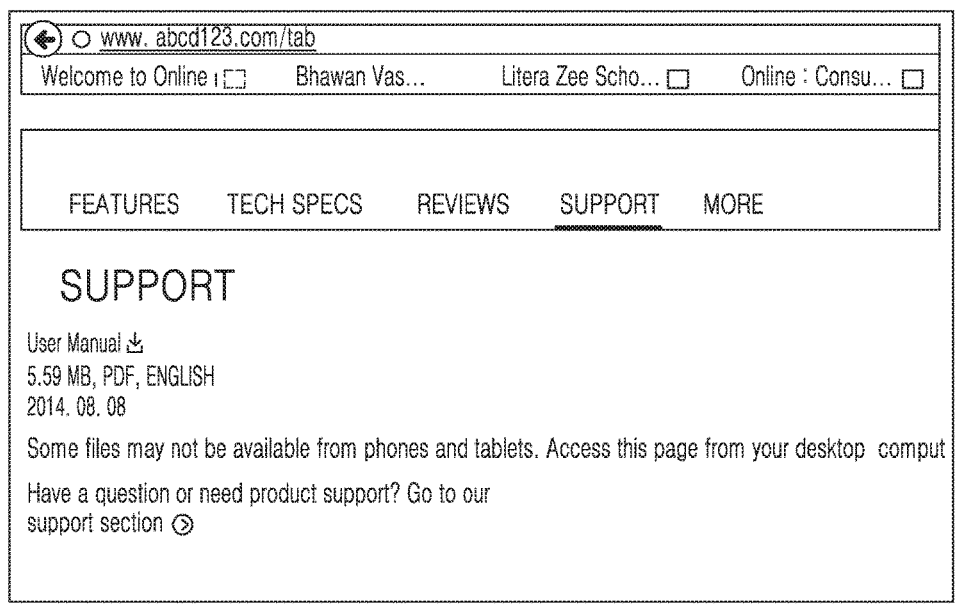

FIG. 12 illustrates an example user Interface that may be displayed, for example, as a pop-up or pop-up window, when the user selects an option to open a webpage corresponding to a smart bookmark. A browser may display the user interface to the user upon receiving one or more inputs for opening a webpage via the smart bookmark. Referring to FIG. 12, when the user selects the option for smart bookmarks, a pop-up displaying a list of all existing smart bookmarks that have been created previously by the user or other users using the example embodiments of the present disclosure is indicated. In the present example, the list indicates 4 bookmarks: 1. —Support, 2. —News, 3. —Video and 4. —Shows. If the user selects the first smart bookmark, i.e. 1. —Support, the browser at the client application end may read the database, modify a virtual page source code (e.g., generate modified source code) of the requested bookmark by altering the default display index values at run time, and directly render the webpage with the Support section/tab as the default display section/tab as indicated in FIG. 13. FIG. 13 illustrates the case in which the Support section/tab (which is not the default tab) is rendered directly upon receiving a request from the user for opening a webpage via the smart bookmark.

Figure 14:
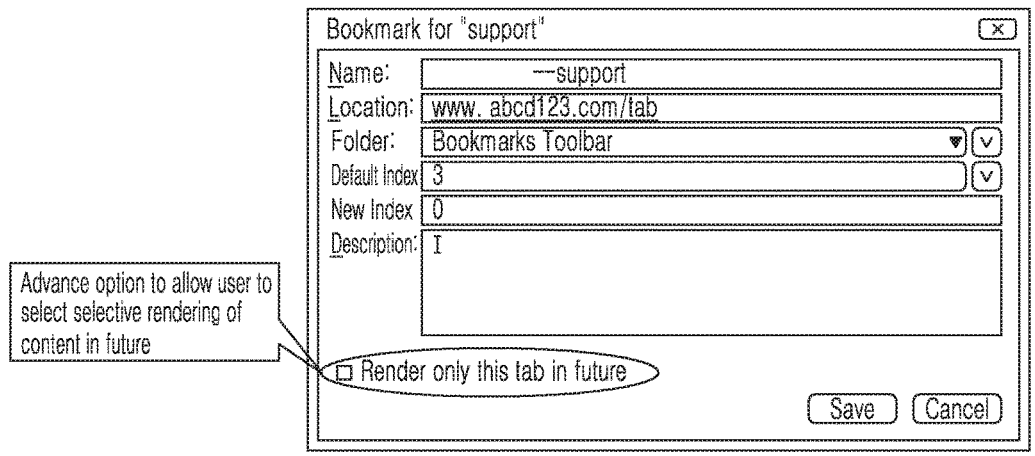

FIG. 14 illustrates an example User Interface providing an option to the user for selective rendering of webpage elements based on the updated display index values corresponding to the webpage elements. Generally, when a user navigates to a webpage via a general bookmark, as opposed to a smart bookmark, the entire webpage is rendered before the user is able to navigate to favorite content, which consumes user's time. To save the user's time and enable faster rendering of the desired content, the bookmarking module 208 may provide the user with an option in the User Interface while creating the bookmark for selective rendering of only the bookmarked content when the user navigates to the website including the bookmarked content. In the present example, when the user selects option 2) described above to bookmark the webpage with the SUPPORT section/tab as the default section/tab, the bookmarking module 208 may provide the user with an option for selective rendering of only the SUPPORT section/tab. Once the user selects the option "Render only this section/tab in the future" for selective rendering of SUPPORT section/tab, the browser will render only the SUPPORT section/tab when rendering the webpage according to the smart bookmark. The selective rendering saves the user time by rendering only the bookmarked content of a webpage, e.g., the content corresponding to the default section/tab of the bookmarked webpage.

Figure 15:
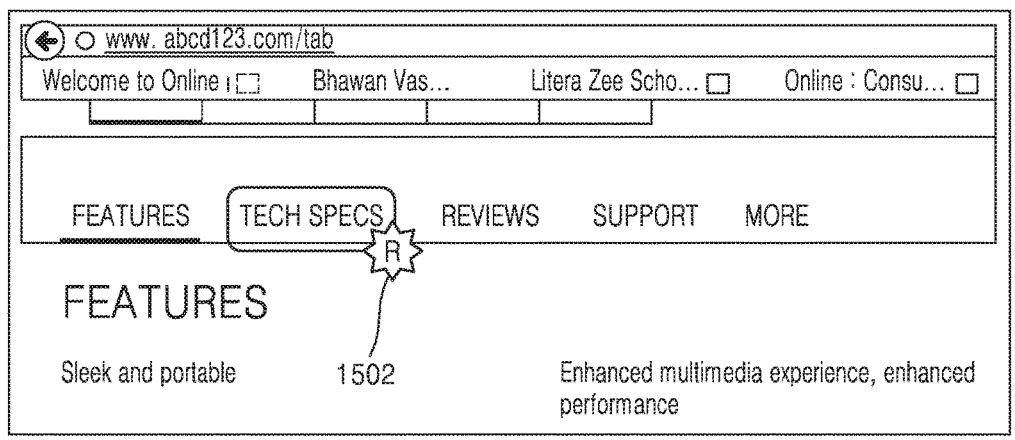

The present disclosure also provides a shortcut key/icon for directly bookmarking the webpage and updating display index values. In an example, the browser may display a shortcut icon for smart bookmarks near the content title so that users can bookmark a webpage (e.g., section/tab) with less steps than above, for example, in one step. The browser may display such a shortcut icon, for example, when a user selects, highlights, or hovers over a section/tab, but is not limited thereto. Also, a shortcut key, a combination of keys, or a hot key may be mapped on an input device for creating smart bookmarks. The input device may include any device capable of receiving a user input, for example, a remote controller, a mouse, or a stylus pen, but is not limited thereto. FIG. 15 illustrates an example user interface illustrating the shortcut icon. As seen, a shortcut icon 1502 near the TECH SPECS section/tab is provided. When the user selects the shortcut icon 1502, the bookmarking module 208 is triggered and may update the display index values such that the TECH SPECS section/tab is the default display index section/tab. In this example, whenever the user selects the bookmarked page in the future, the browser will automatically navigate to the TECH SPECS section/tab (i.e., the default section/tab indicated in the updated display index) while rendering the webpage.

Figure 16:
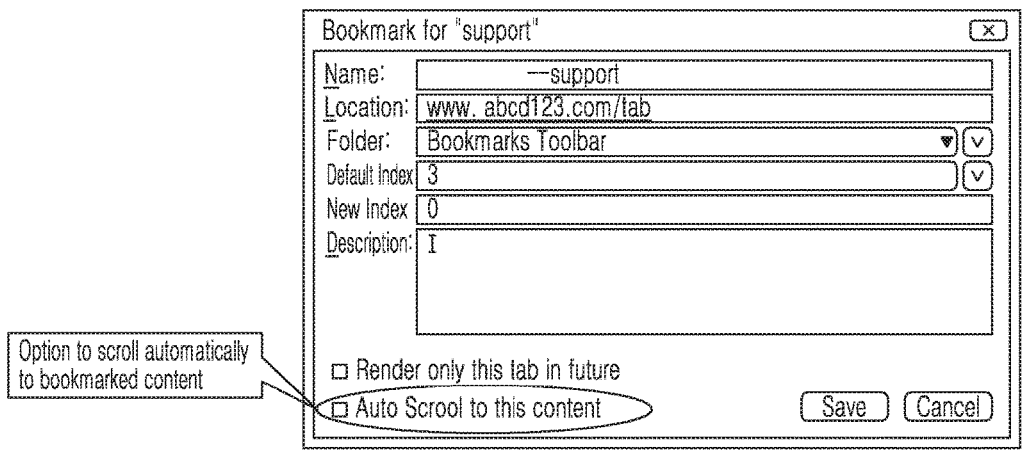

The present disclosure also provides for identifying and storing a scroll position of a webpage element/content at the time of creating smart bookmarks. Storage of a scroll position is beneficial in scenarios where a webpage has a huge page length/size, as when the user accesses such a webpage according to a bookmark, a webpage element/content corresponding to a smart bookmark set by the user is not displayed in the default display area(→as default)(?) when the bookmarked webpage is rendered. To avoid such a situation, the present disclosure provides for identifying and storing a scroll position of a webpage element/content when creating a smart bookmark. Example embodiments of the present disclosure may identify a scroll position according to, for example, coordinates of the webpage element/content on the webpage or scroll length to reach the webpage element/content on the webpage, but are not limited thereto. Storing the scroll position of the webpage element/content allows a browser to directly navigate to webpage elements/content corresponding to a smart bookmark (e.g., allows a user to directly view desired webpage elements/content on the webpage) without having to manually scroll to the webpage elements/content. FIG. 16 illustrates an example User Interface providing an option to the user for automatic scrolling to a webpage element/content based on scroll position thereof. Once the user selects the option "Auto Scroll to this content", the scroll position (indicated by coordinates ((x1, y1), (x2, y2)) are stored in a database as seen in an example table 3 below:

TABLE 3

| Content Title | URL | Default Display Index | New Display Index | Scroll Position |
|---|---|---|---|---|
| FEATURES | www.abcd123.com/tab | 0 | 3 | |
| TECH SPECS | | 1 | 1 | |
| REVIEWS | | 2 | 2 | |
| SUPPORT | | 3 | 0 | ((x1, y1), (x2, y2)) |
| MORE | | 4 | 4 | |

In this example, whenever the user selects the bookmarked page in the future, the browser will automatically navigate to the SUPPORT section/tab (i.e., the default section/tab indicated in the updated display index) while rendering the webpage and directly display the webpage element/content located at the previously stored scroll position, i.e. coordinate (x1, y1), (x2,y2). This allows the browser to directly jump or auto scroll to the stored scroll position, i.e. coordinates (x1, y1), (x2,y2), thus minimizing or avoiding the need for a user to manually scroll to the webpage element/content.

Figure 17:
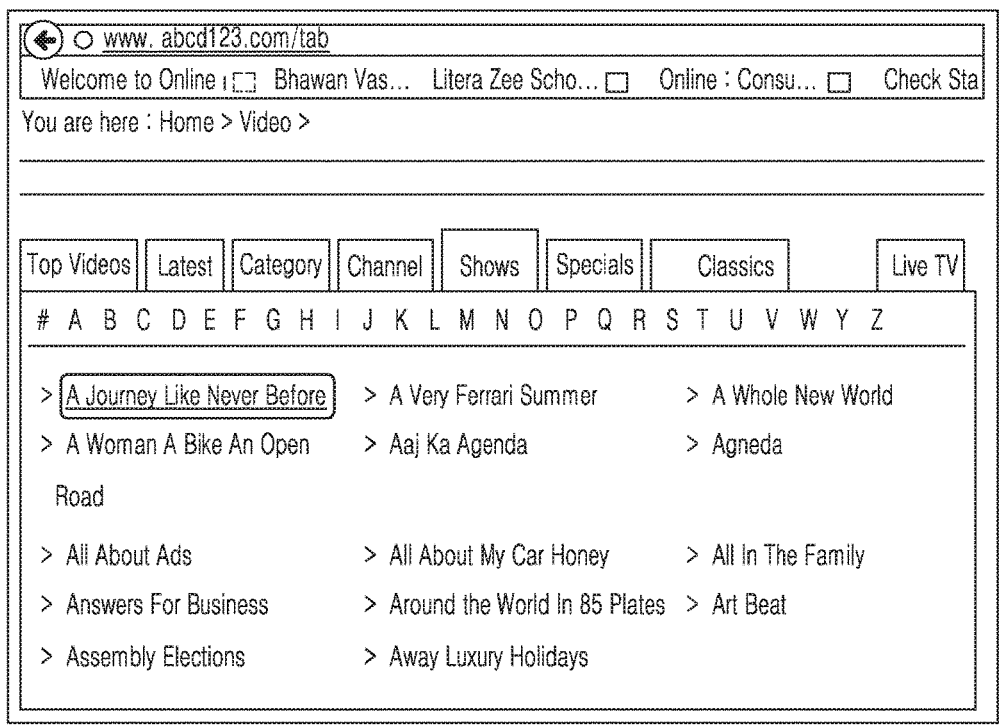

FIG. 17 illustrates an example implementation of the present disclosure in the case of a website having multiple levels (i.e., a hierarchical structure). In this FIG. 17, a website having multiple sections/tabs (Top Videos, Latest, Category, Channel, Shows, Specials, Classics, Live TV) having the same URL (www.abcxyz.com/video/list) are shown. Each of these sections has several sub-sections (corresponding to videos) listed in alphabetical order. As indicated in the FIG. 17, the section/tab "Shows" videos beginning with the letter A (e.g., A Journey Like Never Before, A Very Ferrari Summer, A Whole New World, etc.) are listed. In general browsers, even if a user bookmarks a webpage at a point on the webpage where a favorite video (e.g., "A journey like never before" listed under the letter "A" in "Shows") of the user is listed, each time the user wants to watch the video through the saved bookmark, the user will still have to perform the follow steps: 1) Open the Bookmark; 2) Navigate to or click "Shows"; 3) Navigate to or click "A"; 4) Navigate to or click the video "A Journey Like Never Before". As seen, the procedure for a user to watch a favorite video or access content through the saved bookmark in such a scenario is very time consuming. Moreover, to watch the video, the user must remember and follow the navigation steps even after bookmarking the webpage which lists the video. The present disclosure allows the user to directly bookmark his favorite video in such websites having multiple levels (i.e., a hierarchical structure). The present disclosure involves storing the node identifiers of the tab/section to be bookmarked in the multi-level/hierarchical structure while creating the bookmark and directly navigating to the sections/tabs based on corresponding stored node identifiers when the bookmarked page is rendered. In the present example, a user can directly bookmark the video "A journey like never before" and a browser can directly jump or navigate to this video when opening the webpage via the bookmark.

Figure 18:
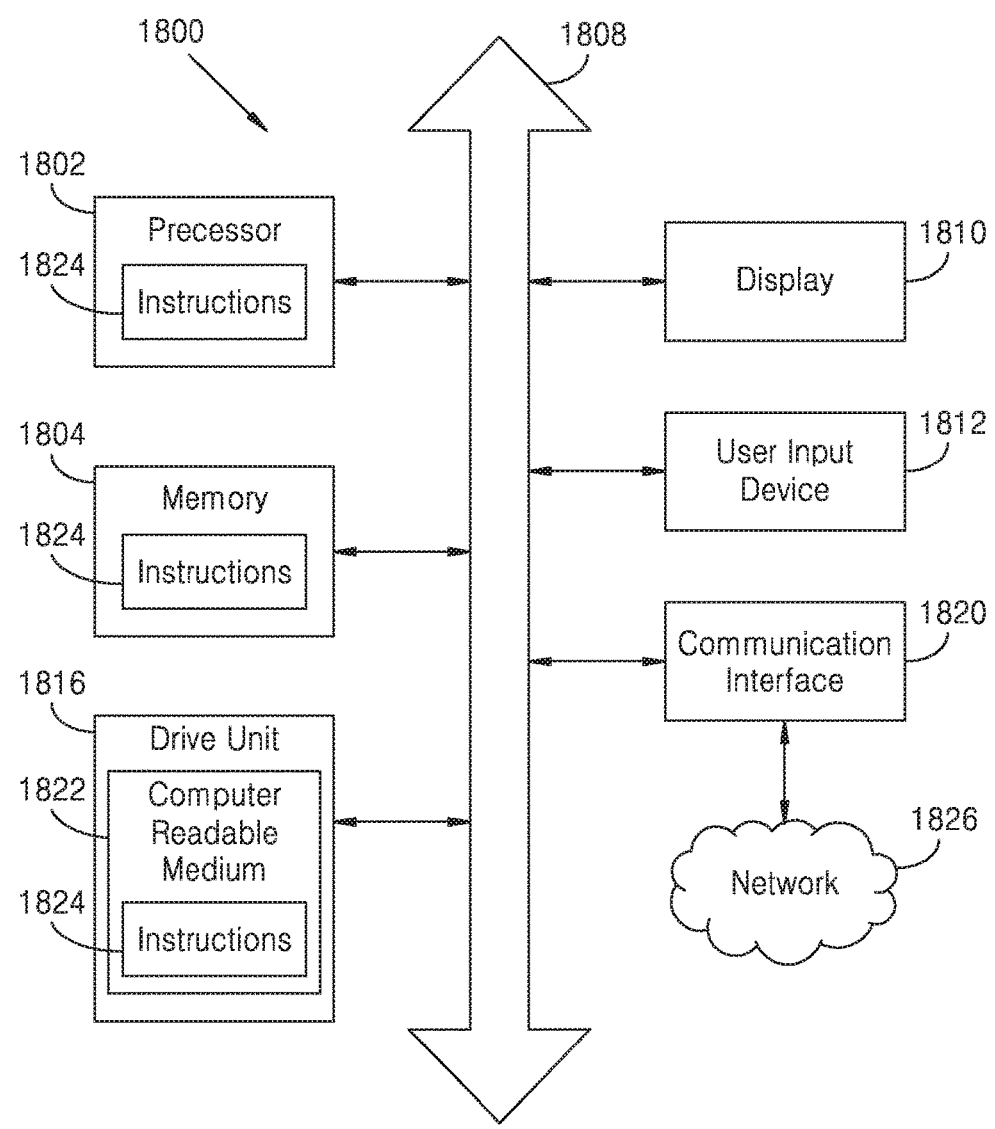
FIG. 18 illustrates a hardware configuration of a computer system, which is representative of an example hardware environment for practicing the present disclosure.

FIG. 18 illustrates a hardware configuration of a computer system, which is representative of a hardware environment for practicing embodiments of the present disclosure. A hardware configuration of the systems 200 and 500 in the form of a computer system 1800 is shown. The computer system 1800 includes a set of instructions that, when executed by the computer system 1800, perform any one or more of the methods disclosed. The computer system 1800 may operate as a standalone device or may be connected to other computer systems or peripheral devices via, for example, a network.

In a networked deployment, the computer system 1800 may operate in the capacity of a server or as a client user computer in a server-client user network environment, or as a peer computer system in a peer-to-peer (or distributed) network environment. The computer system 1800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions, sequential or otherwise, that specify actions to be taken by that machine. Further, while a single computer system 1800 is illustrated, the term "system" shall also be taken to include any collection of systems or sub-systems capable of individually or jointly executing a set, or multiple sets, of instructions to perform one or more computer functions.

The computer system 1800 may include a processor 1802 e.g., a central processing unit (CPU), a graphics processing unit (GPU), or both. The processor 1802 may be a component in a variety of systems. For example, the processor may be part of a standard personal computer or a workstation. The processor 1802 may be one or more general processors, digital signal processors, application specific integrated circuits, field programmable gate arrays, servers, networks, digital circuits, analog circuits, combinations thereof, or other now known or later developed devices for analyzing and processing data. The processor 1802 may implement a software program, such as code generated manually (e.g., programmed).

The computer system 1800 may include a memory 1804, such as a memory 1804 that can communicate via a bus 1808. The memory 1804 may be a main memory, a static memory, or a dynamic memory. The memory 1804 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1804 includes a cache or random access memory for the processor 1802. In alternative examples, the memory 1804 is separate from the processor 1802, such as a cache memory of a processor, the system memory, or other memory. The memory 1804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1804 is operable to store instructions executable by the processor 1802. The functions, acts or tasks illustrated in the FIG.s or described may be performed by the programmed processor 1802 executing the instructions stored in the memory 1804.

The functions, acts or tasks are independent of the type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1800 may further include a display unit 1810, such as a liquid crystal display (LCD), an organic light emitting diode (OLED), a flat panel display, a solid state display, a cathode ray tube (CRT), a projector, a printer or other now known or later developed display device for outputting determined information, but is not limited thereto. The display 1810 may act as an interface for the user to see the functioning of the processor 1802, or specifically as an interface via which the user may interact with the software stored in the memory 1804 or in the drive unit 1816.

Additionally, the computer system 1800 may include an input device 1812 configured via which a user may interact with any of the components of system 1800. The input device 1812 may be a number pad, a keyboard, or a cursor control device, such as a mouse, or a joystick, touch screen display, remote control or any other device operative to interact with the computer system 1800.

The computer system 1800 may also include a disk or optical drive unit 1816. The disk drive unit 1816 may include a computer-readable medium 1822 in which one or more sets of instructions 1824, e.g. software, is embedded. Further, the instructions 1824 may embody one or more of the methods or logic as described. In an example embodiment, the instructions 1824 may reside completely, or at least partially, within the memory 1804 or within the processor 1802 during execution by the computer system 1800. The memory 1804 and the processor 1802 also may include computer-readable media as discussed above.

The present disclosure may be a computer-readable medium that includes instructions 1824 or receives and executes instructions 1824 responsive to a propagated signal so that a device connected to a network 1826 can communicate voice, video, audio, images or any other data over the network 1826. Further, the instructions 1824 may be transmitted or received over the network 1826 via a communication port or interface 1820 or using a bus 1808. The communication port or interface 1820 may be a part of the processor 1802 or may be a separate component. The communication port 1820 may be created in software or may be a physical connection in hardware. The communication port 1820 may connect with a network 1826, external media, the display 1810, or any other components in system 1800 or combinations thereof. The connection with the network 1826 may be a physical connection, such as a wired Ethernet connection or may be established wirelessly as discussed later. Likewise, the additional connections with other components of the system 1800 may be physical connections or may be established wirelessly. The network 1826 may be directly connected to the bus 1808.

The network 1826 may include wired networks, wireless networks, Ethernet AVB networks, or combinations thereof. The wireless network may be a cellular telephone network, or an 802.11, 802.16, 802.20, 802.1Q or WiMax network. Further, the network 1826 may be a public network, such as the Internet, a private network, such as an intranet, or combinations thereof, and may utilize a variety of networking protocols now available or later developed including, but are not limited to TCP/IP based networking protocols.

In an alternative example, dedicated hardware implementations, such as application specific integrated circuits, programmable logic arrays and other hardware devices, may be constructed to implement various parts of the system 1800.

Applications that may include the systems can broadly include a variety of electronic and computer systems. One or more examples described may implement functions using two or more interconnected hardware modules or devices with related control and data signals that may be communicated between and through the modules, or as portions of an application-specific integrated circuit. Accordingly, the present system encompasses software, firmware, and hardware implementations.

The system described may be implemented by software programs executable by a computer system. Further, in a non-limiting example, implementations can include distributed processing, component/object distributed processing, and parallel processing. Alternatively, various parts of the system may be implemented via virtual computer systems.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

The drawings and the forgoing description give examples of embodiments. Those skilled in the art will appreciate that one or more of the described elements may well be combined into a single functional element. Alternatively, certain elements may be split into multiple functional elements. Elements from an example embodiment may be added to another example embodiment. For example, orders of processes described herein may be changed and are not limited to the manner described herein. Moreover, the actions of any flow diagram need not be implemented in the order shown; nor do all of the acts necessarily need to be performed. Also, those acts not dependent on other acts may be performed in parallel with the other acts. The scope of embodiments is by no means limited by these examples. Numerous variations, whether explicitly given in the specification or not, such as differences in structure, dimension, and use of material, are possible. The scope of example embodiments is at least as broad as that of the following claims.

Benefits, other advantages, and solutions to problems have been described above with regard to example embodiments. However, the benefits, advantages, solutions to problems, and any component(s) that may cause any benefit, advantage, or solution to occur or become more pronounced are not to be construed as a critical, required, or essential feature or component of any of the claims.

We claim:

1. A method of bookmarking a webpage, the method comprising:
    detecting a plurality of webpage elements having the same Uniform Resource Locator (URL) from among webpage elements on a webpage;
    determining a default display index value associated with each of the plurality of webpage elements having the same URL;
    updating the default display index value of at least one of the plurality of webpage elements in response to a bookmark event and storing the updated display index value; and
    bookmarking the webpage according to the at least one updated display index value.

2. The method as claimed in claim 1, wherein the detecting of the plurality of webpage elements having the same URL comprises:
    parsing source code of the webpage; and
    identifying a plurality of identifiers in the source code, the plurality of identifiers indicating the plurality of webpage elements having the same URL.

3. The method as claimed in claim 1, wherein the updating of the default display index value of at least one of the plurality of webpage elements comprises updating the default display index values of the plurality of webpage elements.

4. The method as claimed in claim 3, wherein the updating of the default display index values of the plurality of webpage elements comprises interchanging the default display index values with the updated display index values.

5. The method as claimed in claim 3, wherein the updating of the default display index values of the plurality of webpage elements comprises:
    changing the default display index value of a first webpage element included among the plurality of webpage elements having the same URL; and
    rearranging webpage elements remaining from among the plurality of webpage elements having the same URL.

6. The method as claimed in claim 5, wherein the rearranging is based on the default display index values of the remaining webpage elements.

7. The method as claimed in claim 5, wherein the rearranging comprises at least one of:
    increasing the display index values of the remaining webpage elements by a constant; or
    decreasing the display index values of the remaining webpage elements by a constant.

8. The method as claimed in claim 5, wherein the rearranging includes randomly rearranging the remaining webpage elements.

9. The method as claimed in claim 8, wherein the randomly rearranging includes randomly assigning display index values to the remaining webpage elements.

10. The method as claimed in claim 1, further comprising:
    providing a user interface configured to display the default and updated display index values.

11. The method as claimed in claim 1 further comprising:
    providing an option for selective rendering of the webpage elements on the webpage based on the at least one updated display index value.

12. The method as claimed in claim 1, further comprising:
    identifying and storing a position of at least one of the plurality of webpage elements on the webpage.

13. The method as claimed in claim 12, wherein the identifying the position of at least one of the plurality of webpage elements on the webpage includes at least one of:
    determining coordinates of the at least one of the plurality of webpage elements on the webpage; or
    determining scroll length to reach the determined coordinates.

14. The method as claimed in claim 1 further comprising:
    providing a shortcut key for the bookmarking of the webpage according to the at least one updated display index value.

15. The method as claimed in claim 1, wherein the bookmark event includes at least one user input of:
    highlighting of a webpage element;
    input of a combination of keys;

hovering over a webpage element for more than a threshold period;
clicking on a bookmark shortcut key;
selecting a bookmark option via a mouse input; or
selecting a webpage URL from a favorites bar section/tab.

16. The method as claimed in claim 1, wherein the default display index values and the updated display index value are stored either in a same database or in a different database.

17. The method as claimed in claim 1, wherein the webpage elements on the webpage include one or more of textual data, multimedia content including video, still images, audio images, graphics, animation, or a hyperlink to another webpage.

18. An apparatus for bookmarking a webpage, the apparatus comprising:
   at least one processor configured to:
      detect a plurality of webpage elements having the same Uniform Resource Locator (URL) from among webpage elements on a webpage,
      determine a default display index value associated with each of the plurality of webpage elements having the same URL,
      update the default display index value of at least one of the plurality of webpage elements in response to a bookmark event, and
      bookmark the webpage according to the at least one updated display index value.

19. An apparatus for rendering a bookmarked webpage, the apparatus comprising:
   at least one processor configured to:
      receive a request for rendering the bookmarked webpage
      identify whether the bookmarked webpage includes at least one updated display index value, and
      render the bookmarked webpage based on the at least one updated display index value.

20. The apparatus as claimed in claim 19, wherein the at least one processor is further configured to retrieve source code of the bookmarked webpage and set the updated display index value as a default display index value in the source code.

* * * * *